Oct. 30, 1962 Z. D. REYNOLDS 3,061,816

CIRCUIT NETWORK FOR VARIABLY SEQUENCING SIGNALS

Filed April 1, 1958

INVENTOR.
ZACK D. REYNOLDS.

BY Carl R. Brown
agent

3,061,816
CIRCUIT NETWORK FOR VARIABLY SEQUENCING SIGNALS

Zack D. Reynolds, San Diego, Calif., assignor to General Dynamics Corporation, Rochester, N.Y., a corporation of Delaware Filed Apr. 1, 1958, Ser. No. 725,594
3 Claims. (Cl. 340—147)

The present invention relates to a circuit network for variably sequencing signals and more particularly, to a circuit capable of producing either a selectively variable signal output in response to an input of binary signals produced in a fixed sequence, or, a selectively variable binary output in response to a series of input pulses supplied in a fixed sequence. The circuit utilizes unitary gating circuits, which are easily interchangeably positioned in a circuit network. The interchangeability of the gating circuits permits incoming signals of either binary or other types of code to be changed to binary code to be sequenced in an arbitrary manner.

With the advance in electronics, modern day counters, computers or the like, which use or produce binary code signals, have become very complex. This complexity has lead to the design and construction of units capable of doing a specific operation and thereby accomplishing a specific objective. The output of the unit is generally controlled by programming the information fed into the unit. This method of controlling the equipment's output through initial programming has had the effect in many instances of depriving the computer, counter or the like of the flexibility required to adapt to new uses. The circuitry of the computer or the like is designed to respond with a single predetermined output for a predetermined programmed input. Thus, for any programmed input, only a fixed predetermined output and no other can be obtained unless the units circuitry is extensively changed. Further, as equipment of this type becomes more complex, this loss in flexibility becomes more acute. This lack of flexibility is extremely disadvantageous where one unit is required to supply programmed information to a subsequent unit. In this circumstance, the subsequent unit's output cannot be altered as desired by re-programming the input information because the initial programming is controlled by an equally inflexible unit. Accordingly, to adapt the units to a new use or to the point where they are capable of providing a new output for a given programmed input, it has been necessary to modify the circuits in the unit. Such a modification can involve either extensive redesigning of a present unit or the constructing of an entirely new unit to accomplish the new objective. The disadvantages of either of these solutions is readily obvious from either a cost or time view point. It was in light of this problem that the invention was conceived.

The invention provides a supplementary network circuit arrangement that is capable of use with any computer, counter or the like whose output or input involves binary code information. It is capable of two applications. One being to selectively vary the order a series of conductor members will receive a series of signal pulses in response to signals of binary numbers produced in a fixed sequence by the computer. The other application is to produce a selectively varying order of signals of binary numbers to be fed to a computer in response to a fixed serial energization of a pluarlity of conductor members. The invention employs a network circuit arrangement that is preferably positioned exterior to the computer, counter or the like. Unitary "and" gate or "or" gate, gating circuits are interchangeably positioned in the network thereby providing logical gating connections within the network. The output of the network is thus controllable independently of the input code through rearrangement of the gating circuits in the network.

The unitary gating circuits comprise blocks, each of which contain an individual "and" gate or "or" gate that is identified with and responsive to signal pulses corresponding to a particular binary number. The circuit elements of the gating circuits are potted in a plastic-like material, with external conductors positioned on the bottom side thereof. The block is shaped to provide for easy insertion and removal from the network. An indicia is inscribed on the upper surface of the block corresponding to the binary number the potted gate circiut is responsive to. It is intended that the blocks be expendable when found defective and further that they be capable of independent use where it is desirable to use blocks of this type.

It is an object of the present invention to provide a circuit arrangement capable of distributing signals to each of a multiplicity of terminals in any desired sequence in response to an input of binary signals which are serially produced in a fixed sequence.

It is another object of the invention to provide a circuit arrangement capable of creating any selected series of binary signals in response to a fixed series of pulses.

It is still another object of the invention to provide a unitary gating circuit block capable of being used in a variable sequence circuit and which may be easily interchanged with other similar blocks.

It is a further object of the invention to provide a unitary gating circuit block for use in an arbitrary sequence circuit which may be easily manufactured and which may be considered expendable.

It is still a further object of the invention to provide an "and" gate circuit utilizing a minimum number of components, all of which may be easily potted in a plastic block.

Objects and advantages other than those set forth above will become apparent when read in connection with the accompanying specification and drawings, in which.

Figure 4:
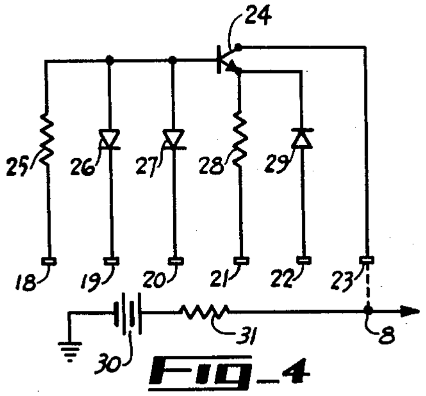
Figure 5:
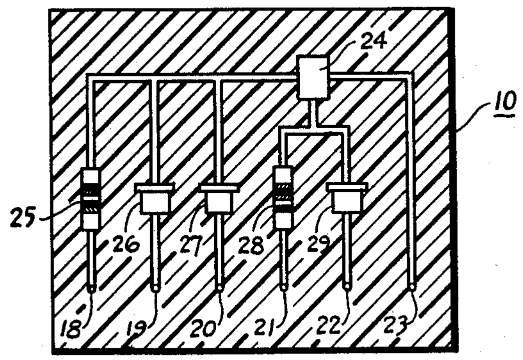
Figure 6:
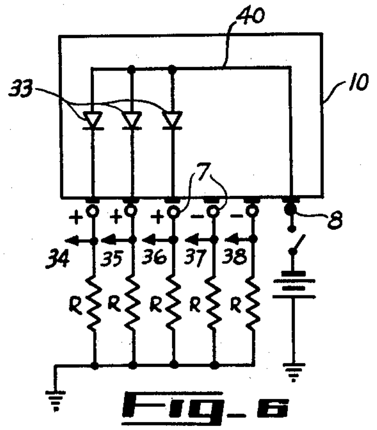

FIGURE 4 diagrammatically illustrates an "and" gate circuit that may be used in the blocks;

FIGURE 5 is a sectional view of the block showing the components potted in the plastic block;

FIGURE 6 is a diagrammatic illustration of the circuit to be used in a modification of the invention.

Figure 1:
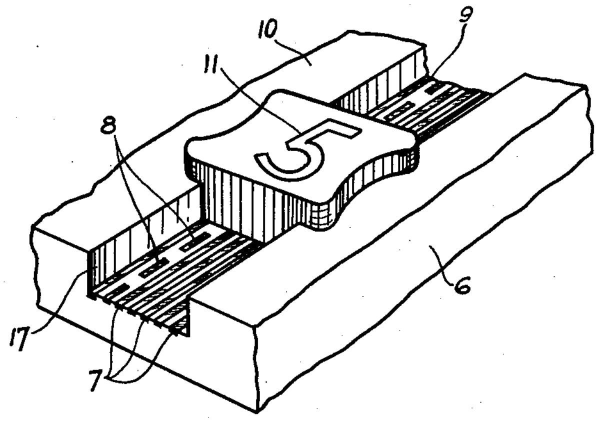
FIGURE 1 is an isometric plan view of a section of the invention having a block mounted thereon.

Referring to FIGURE 1, there is shown a portion of the circuit network with one of the gating circuit blocks mounted thereon. Chassis 6 has a channel 17 for positioning and supporting conductor lines 7 and conductor members 8. The chassis is preferably a part of the control board of the electronic unit in which the invention is employed, thereby permitting manipulation of the blocks external to the unit. Also, it is preferable that chassis 6 be of non-metallic material, thus, reducing the insulation problem and permitting a magnetic arrangement to be used for securing the blocks in position. Channel 17 provides a recess for lateral positioning of the block 10. Conductor lines 7 and conductor members 8 are positioned in the bottom area of channel 17 with their upper surfaces bare, facilitating electrical contact with the corresponding conductors on the bottom surface of the blocks 10. Conductor lines 7 and conductor members 8 may be constructed in any manner known in the art as for example, by metal strips, wires or by printed circuit techniques. A metal strip 9, positioned in the corner of channel 17, coacts with a magnetic member 13 embedded in the edge of the block, to secure the block in operating position.

Figure 2:
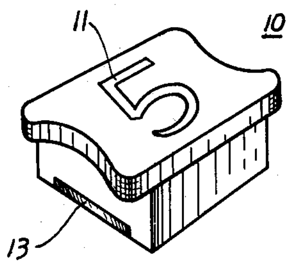
FIGURE 2 is an isometric view of one of the "and" gate or "or" gate blocks.
Figure 3:
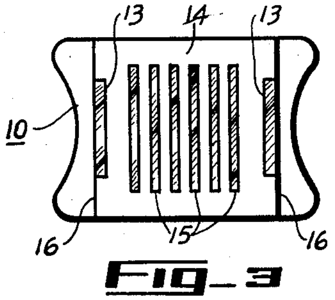
FIGURE 3 is a bottom view of the block illustrating the arrangement of the conductors.

The blocks may take the form as shown in FIGURE 2 having a generally rectangular configuration. They may be constructed of plastic material or any like material capable of providing a shockproof, rigid and relatively non-hydroscopic casting having embedded therein circuit elements such as diodes, resistors and transistors necessary to form the logical gating circuit. FIGURE 5 illustrates the manner of placement in the block of the various circuit elements comprising the "and" gate disclosed in FIGURE 4. The magnetic elements 13 are positioned in either edge of the block and coact with the metal strip 9 in FIGURE 1 to secure the block in operative position. Numbers 11 are placed or etched on the upper surface of each block to identify the particular "and" gate or "or" gate in each block with the particular binary code number of which it is responsive. In FIGURE 3, conductors 15 are each electrically connected to a respective portion of the gate circuit in the block. The conductors 15 may be placed on the block by printed circuit methods, as embedded metallic elements or in any other suitable manner as long as they are raised sufficiently above the surface of the block to assure contact with conductor lines 7 and conductor members 8. The shape of the blocks allow easy grouping along channel 17 and the curved edge configuration facilitates easy handling.

In one mode of operation of the invention, binary code signals are supplied in a fixed sequence to parallel conductor lines 7 (see FIGURE 1). Each binary code number supplied, energizes a predetermined block whose internal gating circuit is responsive to only that binary number or numbers, depending on whether the circuit in the block is an "and" gate or an "or" gate. When the binary code signals in conductor lines 7 constitute the binary number 5, the "and" gate block designated 5 passes a current to the corresponding individual conductor member 8. Each block contacts only one member of the series of conductor members 8 while the block contacts all of conductor lines 7 through conductors 15. Thus, any one block can only energize a single one of said conductor members 8. Each of members 8 is connected with a line leading to another circuit (not shown) that is capable of utilizing the output pulse received from the energized block. The particular conductor member 8 that will receive a signal from a binary code signal through the network may be selectively varied through changing the position of the blocks along the channel. As for example, moving block number 5 to contact another of individual members 8, will cause a different output of logical information to the subsequent circuit for a given binary input.

While it is within the scope of the invention that any suitable "and" or "or" gate may be utilized in the invention or embedded in block 10, the "and" gate circuit illustrated in FIGURE 4 is particularly suited for such use and is the preferred circuit to be used and forms a part of this invention. The "and" gate circuit in FIGURE 4 is arranged to be responsive to an input in conductor lines 7 of a 5-element binary code 11100 when embedded in block 10 and block 10 is positioned in channel 17. However, it can be readily adapted to respond to any binary code by rearranging the circuit elements in accordance with the invention. Lines 18, 19, 20, 21, 22 and 23 are connected to the etched or embedded conductors 15 in the bottom of the block 10, shown in FIGURE 3. When the block is placed in operative position, the lines 18 through 22 are electrically connected to conductor lines 7 and line 23 is electrically connected to individual conductor member 8. Line 23 is the output of the "and" gate and provides an output pulse to one of the individual members 8 when receiving the corresponding binary code. The particular conductor member 8 that will receive an electrical pulse in response to a particular binary code depends upon the positioning of the block along the channel 17.

When an input binary code 11100 is carried in the respective conductor lines 7, positive voltages are supplied to lines 18, 19 and 20 and zero or negative voltages are supplied to lines 21 and 22. NPN type transistor 24 responds to this input code to provide an output voltage to line 23 in the following manner. Line 18 receives a pulse of positive current which passes through resistor 25 to the base of the transistor. Lines 19 and 20 have uni-directional devices 26 and 27 positioned to block positive current flow in a direction toward the base of the transistor. Thus, as long as the pulses of current received by lines 19 and 20 are positive, the potential at the base will be positive from the pulse charge received through line 18. Should either of lines 19 or 20 receive a negative or ground potential pulse, then the positive pulse received from line 18 would pass through the uni-directional device to the negative or ground potential, thereby bleeding off the positive charge on the base and rendering the transistor non-conductive. Therefore, the gate must have positive pulses at terminals 18, 19 and 20 simultaneously for the transistor to conduct. The emitter circuit of the transistor is connected to lines 21 and 22, which are electrically connected to the conductor lines 7 carrying negative or ground potential pulses. Uni-directional device 29 is reversed relative to uni-directional devices 26 and 27 and will pass positive current to the emitter, but blocks current in the reverse direction. The negative charge on line 21 passes through resistor 28 to place a negative potential on the emitter. If either of the lines 21 or 22 receive a positive pulse, the emitter will also be positive. This follows because positive current received by line 22 will pass through the uni-directional device 29 to the emitter and a positive current received by line 21 will pass through resistor 28 to the emitter. Line 23 is normally at a positive potential through its connection to one of conductor members 8 which would, in this occurrence, be maintained at a positive potential. Thus, when the binary code of 11100 is received, the base is charged positive, the emitter negative or at ground potential, and current passes to the positive collector circuit. This flow of current reduces the positive potential of conductor member 8 momentarily until the current through resistor 31 from positive source 30 can recover. This momentary change in the electrical state of conductor member 8 reflects the occurrence of the desired binary code signal to the output circuit.

The circuit and the blocks may also be used in a reverse application to selectively create binary code signals in conductor lines 7 in response to an energy pulse supplied to one of conductor members 8. With reference to FIGURE 6, a block 10 is shown having a circuit that is capable of causing a binary code signal output of 11100 in conductor lines 7 when the circuit is energized through a conductor member 8. In this arrangement, conductor lines 7 are connected through identical resistors to ground or a negative source of potential. Thus, in the normal or static condition, all of the conductor lines 7 are at ground potential or have a negative charge. When the block is in operative position and receiving a signal, unidirectional devices 33 pass a positive pulse received from conductor member 8. Since only lines 34, 35 and 36 are connected to the energized lines, only these lines receive a positive pulse. Taking the path of least resistance, the output pulse follows output lines 34, 35 and 36 rather than passing through resistors R to ground. Since lines 37 and 38 are not connected to line 34, they remain negative, and the total output to the five lines 34 through 38 is 3 positive and 2 negative charges or a binary code of 11100.

The binary code output for any one conductor member 8 can be selectively changed by merely inserting a new block having an "or" gate circuit arranged different from the one disclosed in the block in FIGURE 6. By merely rearranging the lines having the uni-directional devices, the block can be designed to produce any binary signal in conductor lines 7. Uni-directional devices 33 are used in the "or" gate to prevent the passage of positive pulses that may be received from other blocks along conductor lines 7 through line 40 to conductor member 8, or to other of conductor lines 7 which may not be directly energized by the other conducting block.

From the preceding description, it is apparent that the circuit arrangement is capable of providing any sequence output to a multiplicity of conductor members 8 from an input of a fixed sequence of binary numbers by merely rearranging the unitary component blocks. Further, the circuit that is the subject of this invention may also provide any output of binary signals to a given set of conductor lines 7 from a fixed sequence of pulses supplied to a multiplicity of conductor members 8 individually.

The particular embodiment of the invention illustrated and described herein is illustrative only and the invention includes such other modifications and equivalents as may readily appear to those skilled in the art, within the scope of the appended claims.

I claim:

1. In a device wherein a binary code at one terminal means accompanies a pulsed waveform at another terminal means, a circuit block preselected for a given desired combination of binary code signals, said circuit block containing therein a gate circuit peculiar to said desired code and including at least one branch adapted to communicate with one of said terminal means and an additional branch adapted to communicate with said other terminal means, said circuit block having an outer surface, a plurality of electrically conductive strips equal to the number of binary code digits mounted on said outer surface, said strips forming terminations for certain of said branches in accordance with the binary code desired, an electrically conductive element disposed on said outer surface and terminating said additional branch, a chassis block including a channel for receiving said circuit block, said channel having a major surface juxtaposed with said outer surface of said circuit block, a multiplicity of elongated electrically conductive lines disposed on said major surface and arranged to contact individually corresponding strips of said circuit block, a series of electrically conductive segments arranged on said major surface along a path substantially parallel to said lines, one only of said segments being in contact with said element, means for connecting said lines of said chassis block to one of said terminal means, and means for connecting said segment in contact with said element to the other of said terminal means.

2. In a device for selectively creating binary code signals on a series of output conductor lines in response to a pulsed waveform supplied to an input terminal, a circuit block preselected for said desired combination of binary code signals, said circuit block containing therein a gate circuit having a plurality of separate branches adapted to communicate with individual output conductor lines and an additional branch adapted to communicate with said input terminal, said circuit block having an outer surface, a plurality of electrically conductive strips equal to the number of binary code digits mounted on said outer surface, said strips forming terminations for certain of said branches in accordance with the binary code desired, an electrically conductive element disposed on said outer surface terminating said additional branch, a chassis block including a channel for receiving said circuit block and having a major surface mating with said outer surface of said circuit block, a multiplicity of elongated electrically conductive lines disposed on said major surface arranged to contact individually corresponding strips of said circuit block, a series of electrically conductive segments arranged on said major surface along a path substantially parallel to said lines, one only of said segments being in contact with said element, means for connecting said electrically conductive lines of said chassis block to said output conductor lines, and means for connecting said segment in contact with said element to said input terminal.

3. In a device for producing an output pulse at an output terminal in response to receipt of a selected desired combination of binary code signals at input conductor lines, a circuit block preselected for said given desired combination of binary code signals, said circuit block containing therein a gate circuit having a plurality of separate branches adapted to communicate with individual input conductor lines and an additional branch adapted to communicate with said output terminal, said circuit block having an outer surface, a plurality of electrically conductive strips equal to the number of binary code digits mounted on said outer surface, said strips forming terminations for certain of said branches in accordance with the binary code desired, an electrically conductive element disposed on said outer surface terminating said additional branch, a chassis block including a channel for receiving said circuit block and having a major surface mating with said outer surface of said circuit block, a multiplicity of elongated electrically conductive lines disposed on said major surface arranged to contact individually corresponding strips of said circuit block, a series of electrically conductive segments arranged on said major surface along a path substantially parallel to said lines, one only of said segments being in contact with said element, means for connecting said lines of said chassis block to said input conductor lines, and means for connecting said segment in contact with said element to said output terminal.

References Cited in the file of this patent

UNITED STATES PATENTS

| | | |
|---|---|---|
| 2,320,150 | Loughridge | May 25, 1943 |
| 2,557,729 | Eckert | June 19, 1951 |
| 2,590,821 | Kiser | Mar. 25, 1952 |
| 2,683,766 | Cunningham | July 13, 1954 |
| 2,745,956 | Baker | Mar. 15, 1956 |
| 2,838,690 | Eckert et al. | June 10, 1958 |
| 2,850,647 | Fleisher | Sept. 2, 1958 |
| 2,864,075 | Sandiford | Dec. 9, 1958 |
| 2,879,411 | Faulkner | Mar. 24, 1959 |
| 2,897,481 | Shepard | July 28, 1959 |
| 2,943,312 | Von Kummer et al. | June 28, 1960 |

OTHER REFERENCES

Margulius et al.: "A Digital to Analogue Shaft Converter," publication, Fig. 1, pp. 1, 2, 23, 47 and 49 of Thesis M.I.T.

"The Transistor" by Felker, published by Bell Tel., Jan. 29, 1952, pp. 627–726, pages of interest are 664, 665, 716, 718.